(12) United States Patent
Sato et al.

(10) Patent No.: US 10,948,434 B2
(45) Date of Patent: Mar. 16, 2021

(54) X-RAY SPECTROSCOPIC ANALYSIS APPARATUS AND ELEMENTARY ANALYSIS METHOD

(71) Applicant: SHIMADZU CORPORATION, Kyoto (JP)

(72) Inventors: Kenji Sato, Otsu (JP); Akihiro Nishimura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 171 days.

(21) Appl. No.: 15/370,010

(22) Filed: Dec. 6, 2016

(65) Prior Publication Data
US 2017/0160213 A1 Jun. 8, 2017

(30) Foreign Application Priority Data

Dec. 8, 2015 (JP) .............................. JP2015-239671
Jun. 13, 2016 (JP) .............................. JP2016-117184

(51) Int. Cl.
*G01N 23/223* (2006.01)
*G01N 23/207* (2018.01)

(52) U.S. Cl.
CPC ....... *G01N 23/223* (2013.01); *G01N 23/2076* (2013.01); *G01N 2223/0563* (2013.01)

(58) Field of Classification Search
CPC ............. G01N 23/2076; G01N 23/223; G01N 2223/076; G01N 2223/0563; H01J 2235/1283; H01J 35/12; H01J 35/13
See application file for complete search history.

(56) References Cited

U.S. PATENT DOCUMENTS

| 4,472,825 A * | 9/1984 | Jenkins | ..................... G01T 1/36 378/49 |
| 4,817,120 A * | 3/1989 | Pelix | .................. G01N 23/2076 378/45 |

(Continued)

FOREIGN PATENT DOCUMENTS

| AT | 375189 B | 7/1984 |
| CN | 1739023 A | 2/2006 |

(Continued)

OTHER PUBLICATIONS

Communication dated Mar. 13, 2017, issued by the German Patent Office in corresponding German Application No. 102016014213.8.

(Continued)

*Primary Examiner* — Dani Fox
*Assistant Examiner* — Soorena Kefayati
(74) *Attorney, Agent, or Firm* — Sughrue Mion, PLLC

(57) ABSTRACT

An X-ray spectroscopic analysis apparatus includes: a radiation source configured to irradiate a predetermined irradiation area in the surface of a sample with an excitation beam for generating a characteristic X-ray; an analyzing crystal provided facing the irradiation area; a slit provided between the irradiation area and the analyzing crystal, the slit being parallel to the irradiation area and a predetermined crystal plane of the analyzing crystal; and an X-ray linear sensor including linear detection elements arranged in a direction perpendicular to the slit, the detection elements each having a length in a direction parallel to the slit. By detecting characteristic X-rays from different linear portions of the irradiation area for each wavelength, it is possible to perform analysis with sensitivity higher than the sensitivity of a conventional X-ray spectroscopic analysis apparatus that irradiates a point-like irradiation area with an excitation beam.

4 Claims, 8 Drawing Sheets

(56) References Cited

U.S. PATENT DOCUMENTS

| | | | | |
|---|---|---|---|---|
| 4,852,135 | A * | 7/1989 | Anisovich | G01N 23/2076 378/49 |
| 5,179,580 | A * | 1/1993 | Komatani | G01N 23/223 378/44 |
| 5,406,608 | A * | 4/1995 | Yellepeddi | G01N 23/2206 378/45 |
| 5,684,857 | A * | 11/1997 | De Bokx | G01N 23/2076 378/45 |
| 5,745,543 | A * | 4/1998 | De Bokx | G01N 23/2076 378/45 |
| 6,005,915 | A * | 12/1999 | Hossain | G01N 23/2251 378/70 |
| 6,118,850 | A * | 9/2000 | Mayo | G01N 23/2076 378/83 |
| 6,233,307 | B1 * | 5/2001 | Golenhofen | G01N 23/207 378/44 |
| 6,310,935 | B1 * | 10/2001 | Kuwabara | G01N 23/223 378/45 |
| 7,110,503 | B1 * | 9/2006 | Kumakhov | G01N 23/207 378/119 |
| 7,356,114 | B2 * | 4/2008 | Kataoka | G01B 15/02 378/44 |
| 8,687,766 | B2 * | 4/2014 | Wormington | G01T 7/00 378/71 |
| 8,976,936 | B1 * | 3/2015 | Alzaidi | G21K 1/025 378/149 |
| 2003/0223536 | A1 * | 12/2003 | Yun | B82Y 10/00 378/45 |
| 2006/0104419 | A1 * | 5/2006 | Sasayama | G01N 23/207 378/145 |
| 2006/0153332 | A1 * | 7/2006 | Kohno | G21K 1/06 378/82 |
| 2008/0008292 | A1 * | 1/2008 | Krmar | A61B 6/505 378/89 |
| 2008/0283761 | A1 * | 11/2008 | Robinson | G01V 5/0016 250/370.09 |
| 2009/0225944 | A1 * | 9/2009 | Lee | G01N 23/2076 378/71 |
| 2010/0046702 | A1 * | 2/2010 | Chen | G01N 23/223 378/45 |
| 2010/0195795 | A1 * | 8/2010 | Golenhofen | G01N 23/2206 378/84 |
| 2011/0058652 | A1 * | 3/2011 | Seidler | G21K 1/062 378/82 |
| 2011/0081003 | A1 * | 4/2011 | Harding | G01N 23/20066 378/88 |
| 2011/0144922 | A1 * | 6/2011 | Corbett | H01J 37/28 702/28 |
| 2011/0268252 | A1 * | 11/2011 | Ozawa | G01J 3/12 378/82 |
| 2012/0145907 | A1 * | 6/2012 | van Groos | G01N 23/20 250/339.07 |
| 2013/0202084 | A1 * | 8/2013 | Piorek | G01N 23/223 378/45 |
| 2013/0216022 | A1 * | 8/2013 | Lederman | G01N 23/2252 378/45 |
| 2014/0009760 | A1 * | 1/2014 | Finarov | H01L 22/12 356/369 |
| 2014/0229118 | A1 * | 8/2014 | Kinoshita | G01N 23/2252 702/23 |
| 2014/0291518 | A1 * | 10/2014 | Soejima | G01N 23/223 250/310 |
| 2014/0314207 | A1 * | 10/2014 | Erko | G21K 1/067 378/82 |
| 2014/0348298 | A1 * | 11/2014 | Ghammraoui | G01N 23/20091 378/73 |
| 2015/0247811 | A1 * | 9/2015 | Yun | G01N 23/085 378/45 |
| 2017/0052128 | A1 * | 2/2017 | Yun | G01N 23/223 |

FOREIGN PATENT DOCUMENTS

| | | |
|---|---|---|
| CN | 102472714 A | 5/2012 |
| DE | 271570 A1 | 9/1989 |
| EP | 2772752 A1 | 9/2014 |
| JP | 04184155 A | 7/1992 |
| JP | 08128975 A | 5/1996 |
| JP | 2002-189004 A | 7/2002 |
| JP | 2013-096750 A | 5/2013 |
| JP | 2015-190868 A | 11/2015 |
| WO | 97/13142 A1 | 4/1997 |
| WO | 2011/002037 A1 | 1/2011 |

OTHER PUBLICATIONS

Hisashi Hayashi, "Chemical State Analysis of Cr and Fe Compounds by a Laboratory-use High-Resolution X-Ray Spectrometer with Spherically-bent Crystal Analyzers", Adv. X-ray. Chem. Anal., Japan 46, pp. 187-201, issued on Mar. 31, 2015 by AGNE Gijutsu Center Inc.

I Zaharieva, et al., "Towards a comprehensive X-ray approach for studying the photosynthetic manganese complex—XANES, $K\alpha/K\beta/K\beta$-Satellite emission lines, RIXS and comparative computational approaches for selected model complexes", Journal of Physics: Conference Series 190 012142, issued on Nov. 5, 2009 by Institute of Physics (The United Kingdom).

Kenji Sakurai, et al., "Chemical characterization using relative intensity of manganese $K\beta'$ and $K\beta_5$ X-ray fluorescence", Nuclear Instruments and Methods in Physics Research Section B, 199, pp. 391-395, issued on Jan. 2003 by Elsevier B.V. (The Netherlands).

Communication dated Jan. 4, 2019 from the State Intellectual Property Office of the P.R.C. in application No. 201611123986.7.

Notice of Reasons for Refusal dated Nov. 19, 2019 issued by the Japanese Patent Office in counterpart Application No. 2016-237078.

* cited by examiner

MEASUREMENT EXAMPLE OF FeNi ALLOY

PARTIALLY ENLARGED VIEW OF MEASUREMENT EXAMPLE OF FeNi ALLOY

X-RAY SPECTROSCOPIC ANALYSIS APPARATUS AND ELEMENTARY ANALYSIS METHOD

TECHNICAL FIELD

The present invention relates to an X-ray spectroscopic analysis apparatus that subjects characteristic X-rays to spectroscopy and detects the intensity of the characteristic X-rays for each wavelength, the characteristic X-rays being emitted by a sample irradiated with excitation beams such as primary X-rays and electron beams, and to an elemental analysis method using the apparatus.

BACKGROUND ART

A characteristic X-ray emitted by a sample irradiated with an excitation beam has a wavelength characteristic to an element contained in the sample. Therefore, by detecting the intensity of the characteristic X-ray for each wavelength, it is possible to determine the composition of the sample.

Patent Literatures 1 and 2 each describe an X-ray spectroscopic analysis apparatus including: a radiation source that irradiates a micro analysis spot on the surface of a sample with an excitation beam; a planar analyzing crystal on which an X-ray is diffracted; and a detector that detects the X-ray diffracted on the analyzing crystal. When the micro analysis spot is irradiated with an excitation beam, characteristic X-rays are emitted from the micro analysis spot in various directions and hit the analyzing crystal at different incidence angles at different positions. A characteristic X-ray having a certain wavelength is diffracted and reflected only when the wavelength of the characteristic X-ray and the incidence angle of the characteristic X-ray on the analyzing crystal satisfy the condition of Bragg reflection. Therefore, by measuring the intensity of an X-ray reflected on the analyzing crystal for each angle using a linear sensor or the like, it is possible to detect the peak of the characteristic X-ray and to determine the wavelength of the characteristic X-ray. A characteristic X-ray has not only one peak wavelength but also a plurality of peak wavelengths. For X-ray spectroscopic analysis apparatuses, a system that measures an intensity for each wavelength in such a manner to detect a characteristic X-ray is called a "wavelength-dispersive system". Besides the wavelength-dispersive system, the detection systems using X-ray spectroscopic analysis apparatuses include an "energy-dispersive system" that directly detects the energy of a characteristic X-ray one by one, but the wavelength-dispersive system allows elemental analysis with a higher resolution and a higher accuracy than the energy-dispersive system.

CITATION LIST

Patent Literature

[Patent Literature 1] JP 2013-096750 A
[Patent Literature 2] JP 2002-189004 A

Non Patent Literature

[Non Patent Literature 1] Hisashi HAYASHI, "Chemical State Analysis of Cr and Fe Compounds by a Laboratory-use High-Resolution X-Ray Spectrometer with Spherically-bent Crystal Analyzers", Adv. X-ray. Chem. Anal., Japan 46, pp. 187-201, issued on Mar. 31, 2015 by AGNE Gijutsu Center Inc.

[Non Patent Literature 2] I. Zaharieva, et al., "Towards a comprehensive X-ray approach for studying the photosynthetic manganese complex—XANES, $K\alpha/K\beta/K\beta$-satellite emission lines, RIXS, and comparative computational approaches for selected model complexes", Journal of Physics: Conference Series 190 012142, issued on Nov. 5, 2009 by Institute Of Physics (the United Kingdom)

[Non Patent Literature 3] Kenji Sakurai, Hiromi Eba, "Chemical characterization using relative intensity of manganese $K\beta'$ and $K\beta_5$ X-ray fluorescence", Nuclear Instruments and Methods in Physics Research Section B, 199, pp. 391-395, issued on January, 2003 by Elsevier B.V (the Netherlands)

SUMMARY OF INVENTION

Technical Problem

To measure a sample that has a composition homogeneous irrespective of position such as a liquid sample or a powder sample, an analyte region need not to be narrowed to a specific position (micro analysis spot) in the sample, and a wide area is irradiated with an excitation beam to obtain a large quantity of characteristic X-rays to conduct analysis with high sensitivity. However, irradiating a wide area with an excitation beam causes X-rays generated at different positions in the area and having different wavelengths to be diffracted on the analyzing crystal in the same direction, which prevents spectrometry from being performed.

A problem to be solved by the present invention is to provide an X-ray spectroscopic analysis apparatus capable of measuring the composition of a sample that has a homogeneous composition irrespective of position, such as a liquid sample or a powder sample, by spectroscopy with high sensitivity, and to provide an elemental analysis method using the apparatus.

Solution to Problem

An X-ray spectroscopic analysis apparatus according to the present invention made for solving the previously described problem includes:

a) a radiation source configured to irradiate a predetermined irradiation area in a surface of a sample with an excitation beam for generating a characteristic X-ray;

b) an analyzing crystal provided facing the irradiation area;

c) a slit provided between the irradiation area and the analyzing crystal, the slit being parallel to the irradiation area and a predetermined crystal plane of the analyzing crystal; and d) an X-ray linear sensor including linear detection elements arranged in a direction perpendicular to the slit, the detection elements each having a length in a direction parallel to the slit.

In the X-ray spectroscopic analysis apparatus according to the present invention, the predetermined irradiation area in the surface of the sample is irradiated with an excitation beam, characteristic X-rays are emitted from various positions in the region in various directions, and only those of characteristic X-rays passing the slit reach the analyzing crystal. Considering linear portions made by dividing the irradiation area in a direction parallel to the slit, only those of characteristic X-rays having a specific wavelength in the sample emitted from certain one of the linear portions pass the slit, hit the analyzing crystal at an incidence angle, satisfy a predetermined diffraction condition of the analyzing crystal to be diffracted, and enter a detection element of the X-ray linear sensor. Even when X-rays other than the characteristic X-ray having the specific wavelength (including characteristic X-rays having wavelengths other than the specific wavelength) are emitted from the linear portion, the wavelengths are different from the specific wavelength, and thus the X-rays having the wavelengths other than the specific wavelength passing the slit to hit the analyzing crystal do not satisfy the diffraction condition, and do not enter the X-ray linear sensor. The same holds true for X-rays emitted from the other linear portions. Therefore, detecting the position of a peak appearing in the X-ray linear sensor allows the elemental analysis of the sample. In addition, since a characteristic X-ray is detected from a linear portion, it is possible to detect characteristic X-rays in a larger quantity than conventional apparatuses detecting characteristic X-rays from a micro analysis spot, which allows analysis with higher sensitivity. Furthermore, when the composition of a sample is heterogeneous in a micro region (equivalent to the micro analysis spots described in Patent Literatures 1 and 2) but homogeneous on an average over a linear portion, the analysis can be performed using the X-ray spectroscopic analysis apparatus according to the present invention.

The X-ray spectroscopic analysis apparatus according to the present invention may further include:

a second slit provided facing the irradiation area, the second slit being parallel to the irradiation area and the crystal plane of the analyzing crystal; and an energy-detecting X-ray linear sensor including a plurality of linear energy detection elements arranged in a direction perpendicular to the second slit, the energy detection elements being elements configured to detect energy of an X-ray and each having a length in a direction parallel to the second slit.

Using the second slit and the energy-detecting X-ray linear sensor, if the energy-detecting X-ray linear sensor detects characteristic X-rays with the same energy distribution irrespective of position, it mean that the composition of the sample is homogeneous, and thus it is possible to prove that the detection using the above wavelength-dispersive X-ray linear sensor has a high credibility. On the other hand, in the case where the energy distributions of characteristic X-rays detected by the energy-detecting X-ray linear sensor differ by position, the calculation of an index indicating the degree of concordance of pieces of data on different positions, such as a correlation coefficient obtained through statistical processing, allows the representation of degree of the credibility of the detection using the wavelength-dispersive X-ray linear sensor. When the degree of concordance is low, elemental analysis can be performed based on, in place of the detection results using the wavelength-dispersive X-ray linear sensor, energy distributions detected using the energy-detecting X-ray linear sensor (although the resultant resolution is lower than using the wavelength-dispersive X-ray linear sensor).

The energy-detecting X-ray linear sensor is desirably provided on a side opposite to the X-ray linear sensor across an area through which an excitation beam cast on the irradiation area from the radiation source passes so as to prevent characteristic X-rays that should be directed to the wavelength-dispersive detector from entering the energy-dispersive detector.

The X-ray spectroscopic analysis apparatus according to the present invention may include a moving unit configured to move the sample in parallel to the irradiation area. The measurement is performed repeatedly while moving the sample using the moving unit, and when the degree of concordance of a plurality of measurement results obtained is high, the homogeneity in the composition of the sample can be confirmed to be high. In addition, when the degree of concordance of a plurality of measurement results is low, calculating the average value of the plurality of measurement results allows an average composition to be determined.

In the case of using a sample having fluidity such as liquid, the X-ray spectroscopic analysis apparatus according to the present invention may include an agitating unit configured to agitate the sample. This configuration allows the composition in the sample to be homogeneous more reliably.

The X-ray linear sensor can be disposed so that a characteristic X-ray is incident, in a direction perpendicular to an arranging direction of the plurality of the detection elements, on the detection element disposed in a center of the X-ray linear sensor. This configuration reduces the probability that a characteristic X-ray entering each detection element to enter neighboring detection elements, thereby increasing resolution.

Alternatively, the X-ray linear sensor can be disposed so that a characteristic X-ray is incident, in a direction perpendicular to the arranging direction of the plurality of the detection elements, on the detection element at an end of the X-ray linear sensor that a characteristic X-ray having a shorter wavelength enters. This configuration reduces the probability that a characteristic X-ray having a short wavelength easy to transmit an object transmits a detection element that is to detect the characteristic X-ray, so as to be incident on neighboring detection elements, thereby increasing the resolution.

The width of the slit is desirably large at surfaces on a side closer to the irradiation area and a side closer to the analyzing crystal and desirably becomes narrow as the slit extends toward a midpoint of both the surfaces. This configuration makes it possible to narrow the width of characteristic X-rays at the midpoint, as well as to prevent characteristic X-rays incident from the sample side and characteristic X-rays narrowed at the midpoint from being obstructed by both the surfaces.

For the same reason, the width of the second slit is desirably large at surfaces on a side closer to the irradiation area side and a side closer to the energy-detecting X-ray linear sensor and desirably becomes narrow as the second slit extends toward a midpoint of the both the surfaces.

The X-ray spectroscopic analysis apparatus according to the present invention desirably includes an X-ray shield around an X-ray path from the surface of a sample to the X-ray linear sensor. This configuration can prevent scattered X-rays from advancing into the X-ray linear sensor to be erroneously detected as a characteristic X-ray.

In the X-ray spectroscopic analysis apparatus according to the present invention, the value of an average energy resolution, which will be defined below, is desirably 0.5 eV or higher and 20 eV or lower, more desirably 0.5 eV or higher and 2 eV or lower. The average energy resolution of the X-ray spectroscopic analysis apparatus according to the present invention is defined as a value $(EH-EL)/N$ obtained by dividing a difference $(EH-EL)$ between a maximum value $EH$ and a minimum value $EL$ of the energies of characteristic X-rays incident on the X-ray linear sensor from the irradiation area in the surface of the sample via the slit and the analyzing crystal, by a number $N$ of detection elements of the X-ray linear sensor. The maximum value $EH$ and the minimum value $EL$ are determined in accordance with the relative positional relationship between the irradiation area in the surface of the sample, the analyzing crystal, and the X-ray linear sensor, the size of the X-ray linear sensor in a direction perpendicular to the slit, and the like. The value of the average energy resolution is equivalent to the average value of the sizes of detection ranges of X-rays at individual detection elements, the X-rays being separated into spectral components on the analyzing crystal and incident on the X-ray linear sensor. The technical significance of a desirable upper limit value and lower limit value of the average energy resolution is as follows.

By setting the average energy resolution of the X-ray spectroscopic analysis apparatus according to the present invention at 20 eV or lower, it is possible to identify reliably a Kα line and a Kβ line, or an Lα line and an Lβ line detected for every element, which can increase the accuracy in the case where the identification of an element in the sample is performed based on the energy of the peak of at least one of the detected Kα line, Kβ line, Lα line, and Lβ line, and the determination of the element is performed based on the intensity of the peak. Here, as the intensity of the peak, the integrated intensity of the peak may be used, a value at a peak top may be used. Only one of the identification of an element in a sample based on the energy of a peak and the determination of the element based on the intensity of the peak may be performed. That is, when only the identification of an element in a sample is needed, the determination of the element need not be performed, or when the kind of an element in a sample is known, the identification of the element need not be performed.

Furthermore, setting the average energy resolution at 2 eV or lower allows the following two kinds of analyses that are difficult with conventional wavelength-dispersive X-ray spectroscopic analysis apparatuses.

First, setting the average energy resolution at 2 eV or lower allows the identification of a Kα1 line and a Kα2 line emitted from an identical element, as well as the identification of a Kβ1 line and a Kβ3 line, an Lα1 line and an Lα2 line, or an Lβ1 line and an Lβ2 line, for some elements. This allows the identification of an element in a sample to be performed based on the energy of the peak of at least one of the Kα1 line, the Kα2 line, the Kβ1 line, the Kβ3 line, the Lα1 line, the Lα2 line, the Lβ1 line, and the Lβ2 line, and allows the determination of the element based on the intensity of the peak (the intensity at a peak top or the integrated intensity). When the identification cannot be performed, the identification or the determination of an element has to be performed on overlapped two peaks (the Kα1 line and the Kα2 line, the Kβ1 line and the Kβ3 line, the Lα1 line and the Lα2 line, and the Lβ1 line and the Lβ2 line). On the other hand, when the identification can be performed, the identification or the determination of an element can be performed with a still higher accuracy on separated two peaks, and thereby. Also in this case, as in the above, only one of the identification of an element in a sample based on the energy of a peak and the determination of the element based on the intensity of the peak may be performed.

Second, setting the average energy resolution at 2 eV or lower allows the analysis of the valence of an element in the following manner. It is known that a difference in the valence of an element in a sample causes a difference in the peak energies of Kβ lines (a Kβ1 line and a Kβ3 line) and Lβ1 lines (an Lβ1 line and an Lβ2 line) prone to suffer the influence of peripheral electrons. In addition, with regard to the Kβ lines, it is known for some elements that a satellite peak appears on a low-energy side of the peak energy of a Kβ1 line, and the intensity and the peak energy of the satellite peak differ according to valences. Thus, the valence of an element in a sample can be analyzed based on one or more of the energy of the peak of at least one of a Kβ line and an Lβ line, the intensity of a satellite peak on a low-energy side of the Kβ line, and the energy of the satellite peak. At this point, at the same time, calculating the intensity of the peak of at least one of a Kα line and a Lα line having an intensity greater than the intensity of the Kβ line and the Lβ line, respectively (when a Kα1 line and a Kα2 line can be identified in Kα lines, and/or when an Lα1 line and an Lα2 line can be identified in Lα lines, at least one of them may be used), allows quantitative analysis with high precision to be performed together with the valence analysis.

Meanwhile, to lower (improve) the average energy resolution, it is necessary to narrow the range of the energies of characteristic X-rays incident on a detection element of the X-ray linear sensor. To this end, such techniques can be adopted that narrows the range of diffraction angles of characteristic X-rays incident on each detection element from the analyzing crystal by narrowing the width of the detection element or increasing the distance between the X-ray linear sensor and the analyzing crystal. However, the width of a detection element has a limitation, and too a long distance between the X-ray linear sensor and the analyzing crystal makes the apparatus large. Thus, the average energy resolution of the X-ray spectroscopic analysis apparatus is desirably set at 0.5 eV or higher. This setting allows the width of the detection element to be set at 50 μm or larger and allows the length of the X-ray path from the surface of a sample to the X-ray linear sensor to be set at 1 m or shorter.

The higher the average energy resolution of the X-ray spectroscopic analysis apparatus is (the lower the value of the average energy resolution is), the narrower the range of energies measured as a whole. Thus, the X-ray spectroscopic analysis apparatus according to the present invention can include an X-ray spectrometer unit installation unit configured to install a plurality of X-ray spectrometer units made up of the analyzing crystal and the X-ray linear sensor and having different measureable energy ranges so that the plurality of X-ray spectrometer units are disposed on different X-ray paths of characteristic X-rays from the surface of a sample. With this configuration, the measurement is performed with X-ray spectrometer units having different measureable energy ranges disposed on different X-ray paths, so that X-ray spectrometry can be performed over a wide energy range also at a high average energy resolution of the X-ray spectroscopic analysis apparatus. In addition, in the case where the average energy resolution of the X-ray spectroscopic analysis apparatus need not be very high, X-ray spectrometry can be performed over a still wider energy range.

A first specific form of an elemental analysis method according to the present invention uses the X-ray spectroscopic analysis apparatus having an average energy resolution of 0.5 eV or higher and 20 eV or lower, preferably 2 eV or lower, and includes one or both of identifying an element in a sample based on the energy of a detected peak of at least one of a Kα line, a Kβ line, an Lα line, and an Lβ line, and determining an amount of the element based on an intensity of the peak.

A second specific form the elemental analysis method according to the present invention uses the X-ray spectroscopic analysis apparatus having an average energy resolution of 0.5 eV or higher and 2 eV or lower, and includes one or both of identifying an element in a sample based on the energy of a detected peak of at least one of a Kα1 line, a Kα2 line, a Kβ1 line, a Kβ3 line, an Lα1 line, an Lα2 line, an Lβ1 line, and an Lβ2 line, and determining an amount of the element based on an intensity of the peak.

A third specific form of the elemental analysis method according to the present invention uses the X-ray spectroscopic analysis apparatus having an average energy resolution of 0.5 eV or higher and 2 eV or lower, and includes determining the valence of an element in a sample based on one or more of the energy of a detected peak of at least one of a Kβ line and an Lα line, an intensity of a satellite peak on a low-energy side of the Kβ line, and the energy of the satellite peak.

In the elemental analysis method of the third specific form, the determination of an element in a sample is desirably performed based on the intensity of the peak of at least one of a Kα line and a Lα line (when a Kα1 line and a Kα2 line can be identified in Kα lines, and/or when an Lα1 line and an Lα2 line can be identified in Lα lines, at least one of them may be used). In addition, in the elemental analysis method of the third specific form, it is possible to measure temporal changes in one or more of the energy of the peak, the intensity of the satellite peak, and the energy of the satellite peak, and determine temporal changes in the valence of an element in a sample based on the temporal changes.

Advantageous Effects of Invention

According to the X-ray spectroscopic analysis apparatus and the elemental analysis method according to the present invention, it is possible to perform analysis with high sensitivity by detecting a characteristic X-ray from a different linear portion for each wavelength.

DESCRIPTION OF EMBODIMENTS

With reference to FIG. 1 to FIG. 13, description will be made about embodiments of X-ray spectroscopic analysis apparatus and an elemental analysis method, according to the present invention.

First Embodiment

Figure 1:
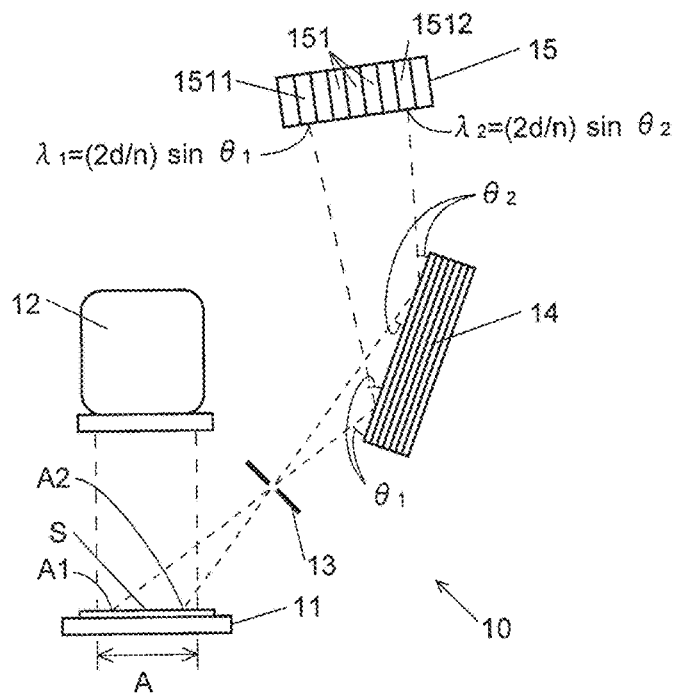
FIG. 1 is a schematic configuration diagram illustrating a first embodiment of an X-ray spectroscopic analysis apparatus according to the present invention.

An X-ray spectroscopic analysis apparatus 10 in a first embodiment includes, as illustrated in FIG. 1, a sample holder 11 that retains a sample S, a radiation source 12, a slit 13, an analyzing crystal 14, and an X-ray linear sensor 15. The sample S may be any one of solid, liquid, or gas, and the sample holder 11 is selected depending on the state of the sample.

The radiation source 12 is an X-ray source that irradiates the sample S with X-rays, excitation light (excitation beams). In place of the X-ray source, an electron beam source may be used. The radiation source 12 irradiates a sheet-shaped irradiation area A of the sample S with the excitation beam. In the present embodiment, the excitation beam is cast perpendicularly on the irradiation area A, but the excitation beam may be cast at an inclined angle with respect to the irradiation area A.

The slit 13 is disposed between the irradiation area A and the analyzing crystal 14. The analyzing crystal 14 used in the present embodiment is a crystal the surface of which is parallel to a crystal plane giving a shortest spacing to cause Bragg reflection, that is, a crystal plane having a smallest diffraction angle. The disposition of the analyzing crystal 14 at small diffraction angles allows only the crystal plane having the shortest spacing to be used for detection of characteristic X-rays, preventing characteristic X-rays undergoing Bragg reflection in other crystal planes from being erroneously detected. The slit 13 is disposed parallel to the irradiation area A as well as the crystal planes of the analyzing crystal 14 used for the detection of characteristic X-rays (i.e., parallel to the surface of the analyzing crystal 14) (perpendicular to the paper in FIG. 1).

The X-ray linear sensor 15 includes a plurality of linear detection elements 151 stacked in a direction perpendicular to the slit 13, where each detection element 151 has a length in a direction parallel to the slit 13 (perpendicular to the paper in FIG. 1). Each detection element 151 may detect only the intensity of an X-ray entering thereon and need not have a function of detecting the wavelength or the energy of the entered X-ray.

Figure 2:
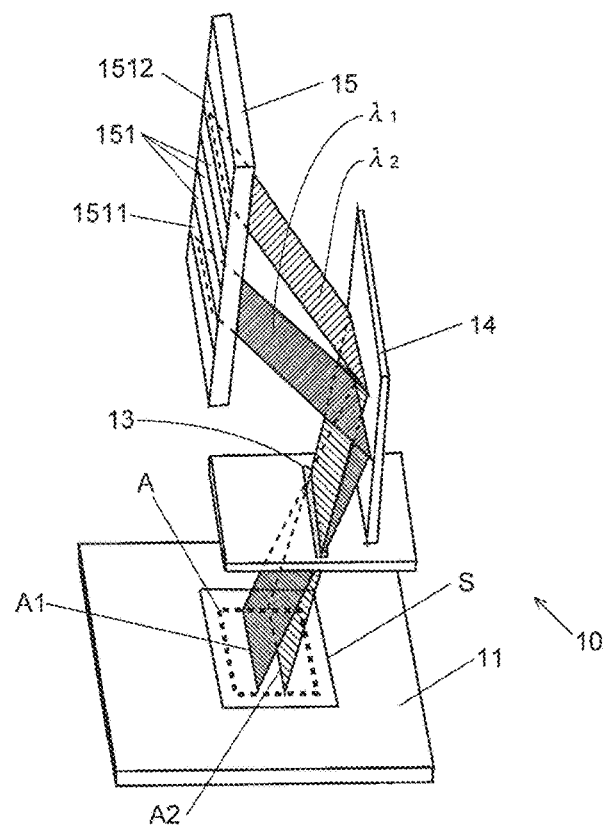
FIG. 2 is a perspective view illustrating a path of characteristic X-rays emitted from an irradiation area of excitation beam to be detected by an X-ray linear sensor, in the X-ray spectroscopic analysis apparatus in the present embodiment.

Referring FIG. 1 and FIG. 2, the operation of the X-ray spectroscopic analysis apparatus 10 in the present embodiment will be described.

With the sample S retained by the sample holder 11, the radiation source 12 irradiates the irradiation area A of the surface of the sample S with X-rays as excitation beam. This causes characteristic X-rays to be emitted from the whole of the irradiation area A. The characteristic X-rays have different wavelengths depending on elements constituting the sample S. In the case where the composition in the sample S differs depending on position, the characteristic X-rays emitted from the irradiation area A also differs depending on position. Such a case will be described later together with the description of an X-ray spectroscopic analysis apparatus 20 (FIG. 3) in a second embodiment. The description will be made here about the case where the composition in the sample S is homogeneous.

As to characteristic X-rays emitted from the irradiation area A, in a linear portion in the irradiation area A parallel to slit 13, a characteristic X-ray to pass through the slit 13 is only a characteristic X-ray emitted in a direction in which the characteristic X-ray hits the surface of the analyzing crystal 14 at a specified incidence angle $(90-\theta)°$ ($\theta$ is a diffraction angle at which the characteristic X-ray undergoes Bragg reflection in the analyzing crystal 14). Then, characteristic X-rays emitted from linear portions different in position and passing through the slit 13 hit the analyzing crystal 14 at different incidence angles. For example, characteristic X-rays emitted from a linear portion A1 illustrated in FIG. 1 and FIG. 2 hit the analyzing crystal 14 only at an incidence angle $(90-\theta_1)°$, and characteristic X-rays emitted from another linear portion A2 hit the analyzing crystal 14 only at an incidence angle $(90-\theta_2)°$.

Characteristic X-rays hit the analyzing crystal 14 from individual linear portions in the irradiation area A are diffracted (reflected) at diffraction angle $\theta$ only when the characteristic X-ray has a wavelength satisfying $\lambda=(2d/n)\sin\theta$ under the condition of the Bragg reflection, where $\lambda$ denotes the wavelength of the characteristic X-ray, d denotes the spacing of crystal planes of the analyzing crystal 14, and n denotes an order. The characteristic X-ray diffracted (reflected) on the analyzing crystal 14 is detected by one of the detection elements 151 of the X-ray linear sensor 15. As mentioned previously, a characteristic X-ray hits the analyzing crystal 14 at a specific incidence angle $(90-\theta)°$ which is different depending on linear portion in the irradiation area A. Therefore, for each linear portion, only a characteristic X-ray having a specific wavelength enters the X-ray linear sensor 15 and detected by the different detection element 151. For example, of characteristic X-rays emitted from the linear portion A1 illustrated in FIG. 1 and FIG. 2, only a characteristic X-ray having a wavelength $\lambda_1=(2d/n)\sin\theta_1$ enters the X-ray linear sensor 15 and detected by a detection element 1511, and of characteristic X-ray emitted from the linear portion A2, only a characteristic X-ray having a wavelength $\lambda_2=(2d/n)\sin\theta_2$ different from $\lambda_1$ enters the X-ray linear sensor 15 and detected by a detection element 1512 different from the detection element 1511. Therefore, detecting the intensities of X-rays entered the individual detection element 151 of the X-ray linear sensor 15 yields a wavelength spectrum of characteristic X-rays emitted from the irradiation area A. The composition of the sample S can be determined based on this wavelength spectrum.

According to the X-ray spectroscopic analysis apparatus 10 in the present embodiment, a detection element 151 of the X-ray linear sensor 15 detects a characteristic X-ray having a wavelength emitted from a linear portion in the sheet-shaped irradiation area A of the sample S which is irradiated with excitation beam, and thus it is possible to perform analysis with sensitivity higher than that of conventional X-ray spectroscopic analysis apparatuses described in Patent Literatures 1 and 2 each of which irradiates a point-like region with an excitation beam and detects a characteristic X-ray emitted from the point-like region.

Second Embodiment

Figure 3:
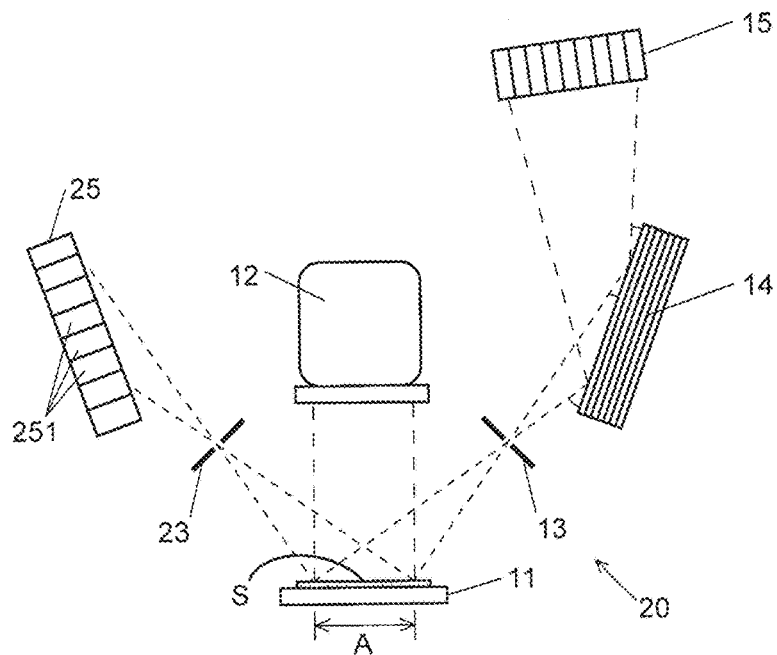
FIG. 3 is a schematic configuration diagram illustrating a second embodiment of the X-ray spectroscopic analysis apparatus according to the present invention.

Next, referring to FIG. 3, an X-ray spectroscopic analysis apparatus 20 in a second embodiment will be described.

The X-ray spectroscopic analysis apparatus 20 in the second embodiment includes, in addition to the components of the X-ray spectroscopic analysis apparatus 10 in the first embodiment, an energy-detecting X-ray linear sensor 25, and a second slit 23 provided between the irradiation area A and the energy-detecting X-ray linear sensor 25. The second slit 23 and the energy-detecting X-ray linear sensor 25 are provided on a side opposite to the slit 13 and the X-ray linear sensor 15 across the area through which excitation beam cast from the radiation source 12 on the irradiation area A passes.

The second slit 23 is provided parallel to the irradiation area A and parallel to the crystal plane of the analyzing crystal 14, which allows a characteristic X-ray generated in the linear portion in the irradiation area A to pass through the second slit 23. The energy-detecting X-ray linear sensor 25 includes linear energy detection elements 251 stacked in a direction perpendicular to the second slit 23, where each energy detection element 251 has a length in a direction parallel to the second slit 23 (i.e., parallel to both the irradiation area A and the crystal plane of the analyzing crystal 14). Each of the energy detection elements 251 has an energy discriminating function in addition to the function of the X-ray detection element 151, so as to be able to detect energy distribution of an incident X-ray. The energy detection elements 251 need not have such a high energy resolution that is required in single-element detectors, which are generally used in energy-detecting X-ray spectroscopic analysis apparatuses.

The description will be made about how to use the X-ray spectroscopic analysis apparatus 20 in the second embodiment.

The operations and functions of the radiation source 12, the slit 13, the analyzing crystal 14, and the X-ray linear sensor 15 are the same as those of the X-ray spectroscopic analysis apparatus 10 in the first embodiment. Therefore, as with the X-ray spectroscopic analysis apparatus 10 in the first embodiment, the wavelength spectrum of characteristic X-rays emitted from the irradiation area A can be obtained. Besides, the second slit 23 and the energy detection elements 251 are provided in such a manner as to be parallel to the irradiation area A and the crystal plane of the analyzing crystal 14. Therefore, part of a characteristic X-ray generated from the same linear portion in the irradiation area A as that of a characteristic X-ray incident and diffracted on the crystal plane of the analyzing crystal 14 passes through the second slit 23 and enters the energy-detecting X-ray linear sensor 25, and an energy distribution is detected by an energy detection element 251 different for each linear portion.

In the case where the composition of the sample S is homogeneous irrespective of position, a characteristic X-ray having the same energy distribution is emitted from every linear portion, and thus an energy distribution detected by each energy detection element 251 is the same. Meanwhile, in the case where the composition of the sample S differs depending on position, a detected energy distribution differs depending on the energy detection element 251. For this reason, for example, based on energy distributions each obtained from each energy detection elements 251, that is, at each position of a linear portion, a degree of concordance such as a correlation coefficient is calculated through common statistical processing so as to obtain an index indicating the credibility of a wavelength spectrum obtained by the X-ray linear sensor 15. In addition, in the case where the credibility of a wavelength spectrum is low, in place of the wavelength spectrum obtained by the X-ray linear sensor 15, elemental analysis may be performed for each position of a linear portion based on an energy distribution obtained by each energy detection element 251 of the energy-detecting X-ray linear sensor 25. Furthermore, when the number of elements of interest in the sample S is only one, the energy detection elements 251 need not perform the detection over the entire energy range but narrows the energy range so as to detect only the element of interest, which enables the distribution of the element of interest to be measured in a short time.

Modification Common to First Embodiment and Second Embodiment

The description will be made below about a plurality of modifications of the X-ray spectroscopic analysis apparatus according to the present invention. These modifications are applicable to both the first and second embodiments.

Figure 4:
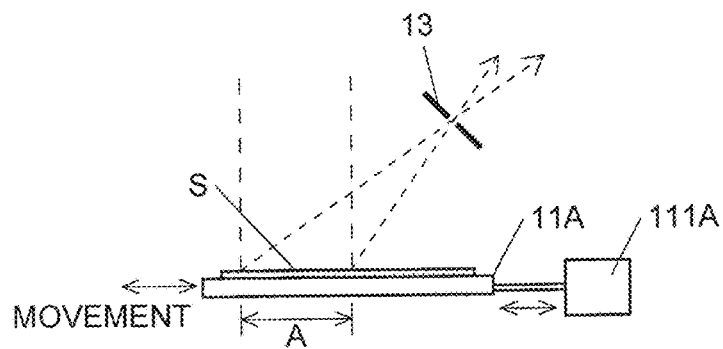
FIG. 4 is a schematic configuration diagram illustrating an example of a sample holder in a modification of the X-ray spectroscopic analysis apparatus according to the present invention.

FIG. 4 illustrates a modification of the sample holder 11. A sample holder 11A in this modification includes a movement mechanism 111A capable of moving the sample S in parallel to the irradiation area A. Performing the measurement with the sample S moved in parallel to the irradiation area A shows no variations in detection results from each detection element 151 of the X-ray linear sensor 15 when the composition of the sample S is homogeneous, whereas showing variations in detection results with the movement of the position on the sample S when the composition of the sample S is heterogeneous. This allows the homogeneity of the sample S to be confirmed. In addition, performing the measurement a plurality of times with repeated movements allows an average composition of the sample S to be detected.

Figure 5:
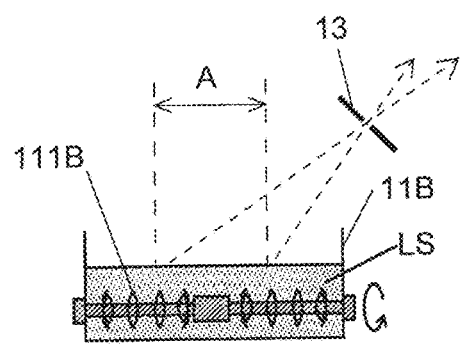
FIG. 5 is a schematic configuration diagram illustrating another example of the sample holder in a modification of the X-ray spectroscopic analysis apparatus according to the present invention.

FIG. 5 illustrates another modification of the sample holder 11. A sample holder 11B in this modification is a container that retains a liquid sample LS and includes an agitator 111B that agitates the liquid sample LS in the container. Agitating the liquid sample LS in the container using the agitator 111B can make the composition of the liquid sample LS homogeneous. A liquid sample LS deteriorating with time does not necessarily deteriorate homogeneously as a whole, but unevenness occurs in deterioration from position to position. Therefore, performing such agitation is effective. The present modification is applicable to not only liquid samples but also powder samples.

Figure 6A:
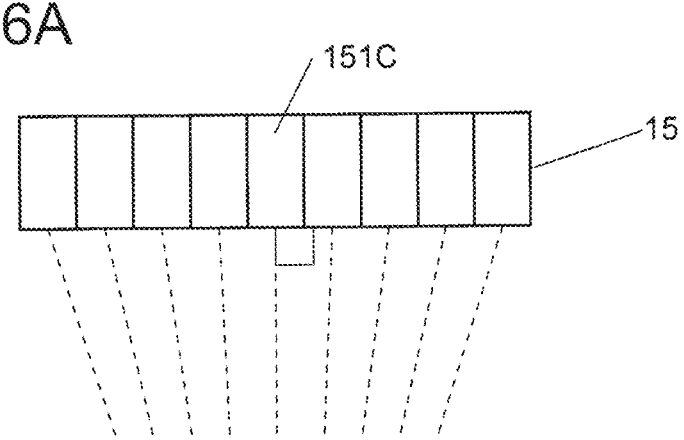
FIG. 6A and FIG. 6B are diagrams illustrating two examples of the orientation of the X-ray linear sensor in the X-ray spectroscopic analysis apparatus according to the present invention.
Figure 6B:
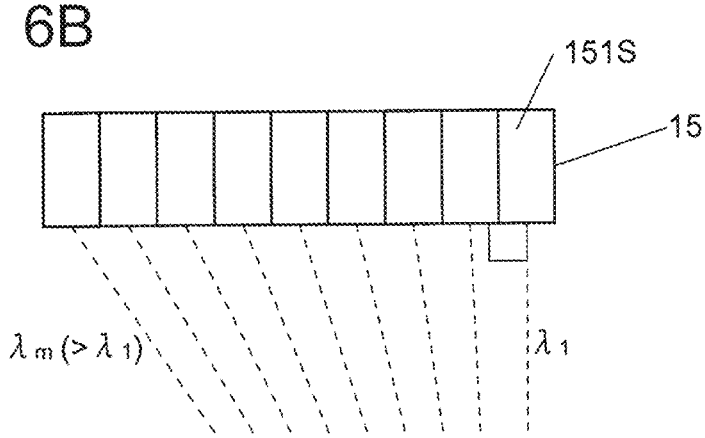

FIG. 6A and FIG. 6B illustrate two examples in which the orientation of the X-ray linear sensor 15 is different.

In the example illustrated in FIG. 6A, the orientation of the whole of the X-ray linear sensor 15 is determined so that a characteristic X-ray diffracted on the analyzing crystal 14 enters a detection element 151C that is located in the center of the plurality of detection elements 151 provided in the X-ray linear sensor 15, in a direction perpendicular to the arranging direction of the detection elements 151. This configuration prevents characteristic X-rays from entering the detection elements 151 in directions significantly inclining from the perpendicular direction. This reduces the probability that a characteristic X-ray to be entered each detection element 151 is entered neighboring detection elements, thereby increasing the resolution of the apparatus.

Meanwhile, in the example illustrated in FIG. 6B, the orientation of the whole of the X-ray linear sensor 15 is determined so that a characteristic X-ray diffracted on the analyzing crystal 14 enters a detection element 151S that is located at one end of the plurality of the detection elements 151 disposed provided in the X-ray linear sensor 15 and which a characteristic X-ray having the shortest wavelength enters, in a direction perpendicular to the arranging direction of the detection elements 151. This configuration reduces the probability that a characteristic X-ray having a short wavelength easy to transmit an object transmits a detection element that is to detect the characteristic X-ray, so as to enter neighboring detection elements, thereby increasing the resolution.

Figure 7:
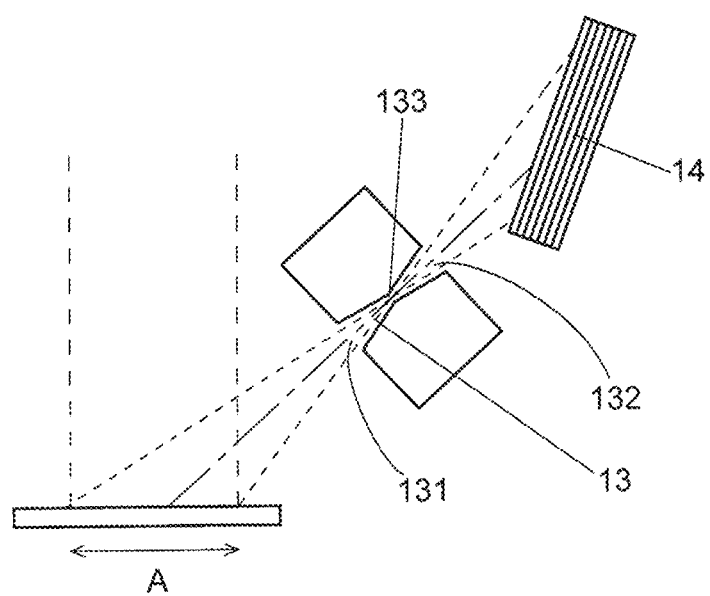
FIG. 7 is a cross-sectional view illustrating an example of a slit in the X-ray spectroscopic analysis apparatus according to the present invention.

FIG. 7 illustrates an example of the slit 13 in the X-ray spectroscopic analysis apparatuses in the first and second embodiments. This slit 13 is formed so as to become wide at a surface 131 on an irradiation area A side and at a surface 132 on an analyzing crystal 14 side and become narrow as the slit 13 extends from both the surfaces toward a midpoint 133. This configuration makes it possible to narrow the width of characteristic X-rays at the midpoint 133, as well as to prevent characteristic X-rays incident from the irradiation area A side from being obstructed by the surface 131 on the irradiation area A side, and to prevent characteristic X-rays passing through the midpoint 133 from being obstructed by the surface 132 on the analyzing crystal 14 side.

Figure 8:
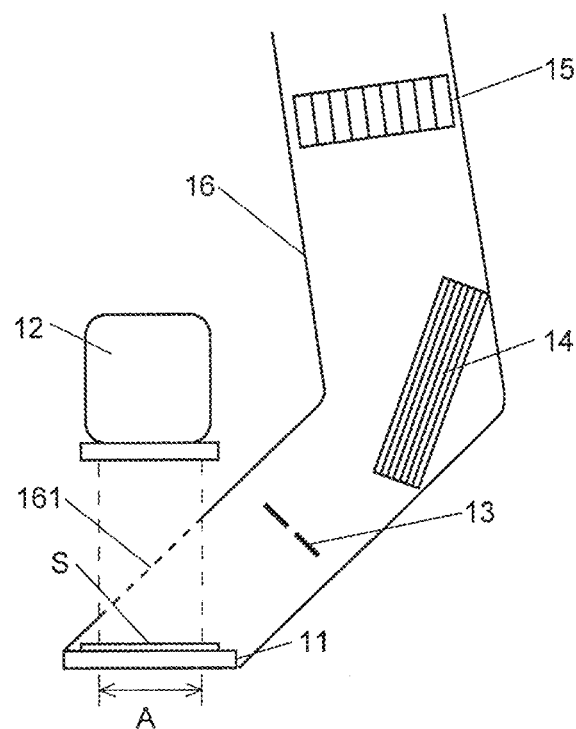
FIG. 8 is a schematic configuration diagram illustrating an example of an X-ray shield in the X-ray spectroscopic analysis apparatus according to the present invention.

FIG. 8 illustrates an example in which an X-ray shield is provided in the X-ray spectroscopic analysis apparatus 10 in the first embodiment. In this example, an X-ray path from (the surface of the sample S mounted on) the sample holder 11, via the slit 13 and the analyzing crystal 14, to the X-ray linear sensor 15 is housed in a pipe of a pipe-shaped X-ray shield 16. The pipe of the X-ray shield 16 is bent at the location of the analyzing crystal 14 along the X-ray path in which a characteristic X-ray is diffracted on the analyzing crystal 14. In addition, in a portion of the X-ray shield 16 through which an excitation X-ray cast from the radiation source 12 to the sample S passes, a window 161 is provided through which the excitation X-ray can pass. The X-ray shield 16 used in the present embodiment is brass-made and has a wall thickness of 3 mm. The material and the wall thickness of the X-ray shield 16 can be selected in accordance with the energy of a excitation X-ray. Using such an X-ray shield 16 prevents an X-ray scattered on the X-ray linear sensor 15 from being detected as a characteristic X-ray, thereby increasing the measurement precision of the apparatus. Also in the X-ray spectroscopic analysis apparatus 20 in the second embodiment, an X-ray shield 16 such as the above can be provided in an X-ray path from the sample holder 11 via the slit 13 and the analyzing crystal 14 to the X-ray linear sensor 15. In this case, as previously described, the detection by the energy detection element 251 does not require such a high resolution, and thus an X-ray shield need not be provided in the X-ray path from the sample holder 11 via the second slit 23 to the energy detection element 251, but of course, this X-ray path may be provided with an X-ray shield such as the above.

Figure 9:
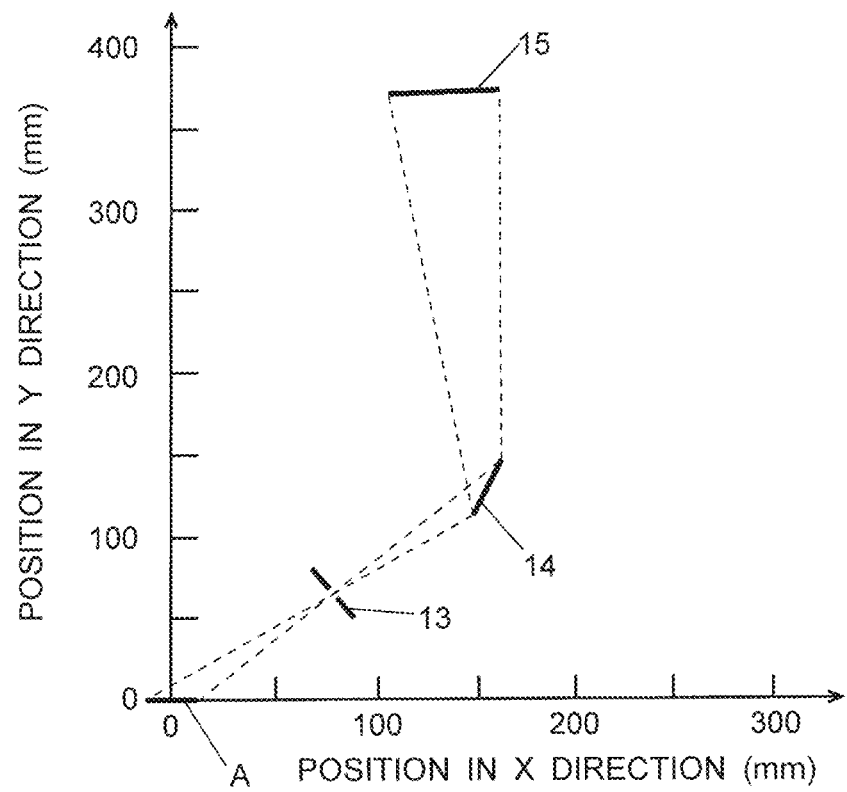
FIG. 9 is a schematic diagram illustrating an example of the size and the disposition of an analyzing crystal, as well as the size and the disposition of the X-ray linear sensor, in the X-ray spectroscopic analysis apparatus according to the present invention.

FIG. 9 illustrates an example of the size and the disposition of the analyzing crystal 14, and the size and the disposition of the X-ray linear sensor 15 in the X-ray spectroscopic analysis apparatus 10 in the first embodiment, in the form of a cross section perpendicular to the slit 13 (i.e., perpendicular to linear portions in the irradiation area A). It is assumed here that, a direction parallel to the slit 13 is a z direction, a direction perpendicular to the slit 13 and parallel to the plane of the irradiation area A is an x direction, and a direction perpendicular to the slit 13 and perpendicular to the plane of the irradiation area A is a y direction. In addition, a position in the x direction and the y direction from an origin, the center of the irradiation area A in the x direction, is hereafter expressed in the unit mm (millimeter). In this example illustrated in FIG. 9, the size of the analyzing crystal 14 in the cross section is set at 36 mm, and the size of the X-ray linear sensor 15 in the cross section is set at 64 mm. The X-ray linear sensor 15 includes the detection elements 151, the number of which is 1280 in total, arranged in a line at 50-μm intervals. The position of the slit 13 is x=75.8, y=63.6, the center position of the analyzing crystal 14 is x=156.0, y=130.9, the center position of the X-ray linear sensor 15 is x=138.0, y=371.3. The incidence angles of characteristic X-rays on the analyzing crystal 14 are $\theta_1$=32.4280 and $\theta_2$=23.2510. With this configuration, a maximum value EH of the energy of detectable characteristic X-ray is 7800 eV, a minimum value EL is 5742 eV, and the average energy resolution of the X-ray spectroscopic analysis apparatus 10 is (7800−5742)/1280=1.61 eV.

Figure 10A:
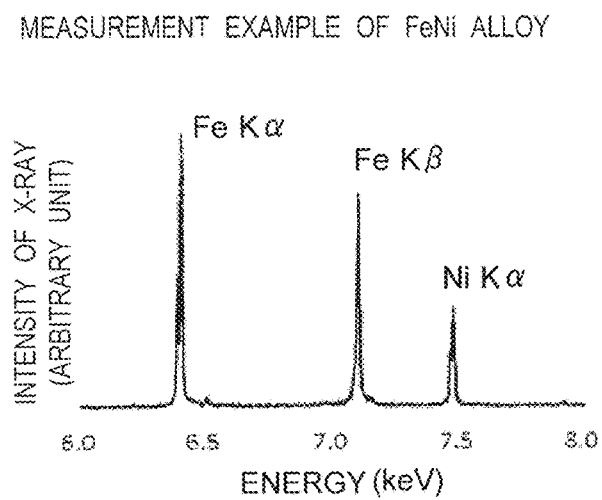
FIG. 10A is a graph illustrating the results of measuring characteristic X-rays obtained from a FeNi alloy using the X-ray spectroscopic analysis apparatus illustrated in FIG. 9.
Figure 10B:
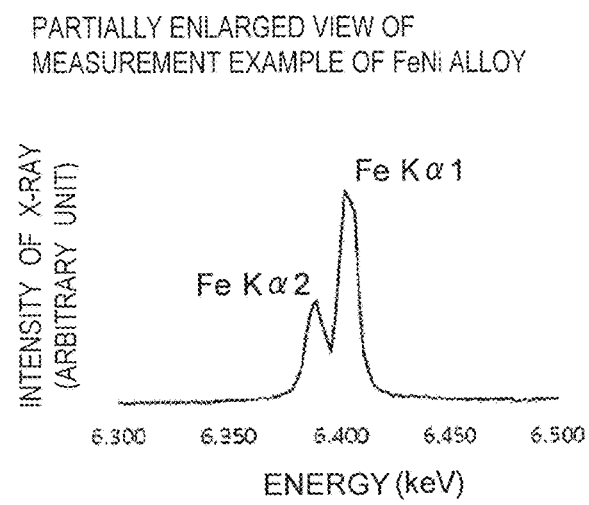
FIG. 10B is a partially enlarged view of the graph.

FIG. 10A and FIG. 10B illustrate the results of measuring characteristic X-rays on a FeNi alloy as a sample, using the X-ray spectroscopic analysis apparatus 10 including components of the sizes and the dispositions illustrated in FIG. 9. As illustrated in FIG. 10A, the Kα line and the Kβ line of Fe can be clearly identified. In addition, in FIG. 10B, the Kα line of Fe in FIG. 10A is illustrated under magnification. The difference in energy between the peak tops of the Kα1 line and the Kα2 line of Fe is about 13 eV, which cannot be separated by conventional wavelength-dispersive X-ray spectroscopic analysis apparatuses. Contrary to this, with the X-ray spectroscopic analysis apparatus 10 in the present embodiment, both the peak tops are clearly separated, as is clear from FIG. 10B.

Figure 11A:
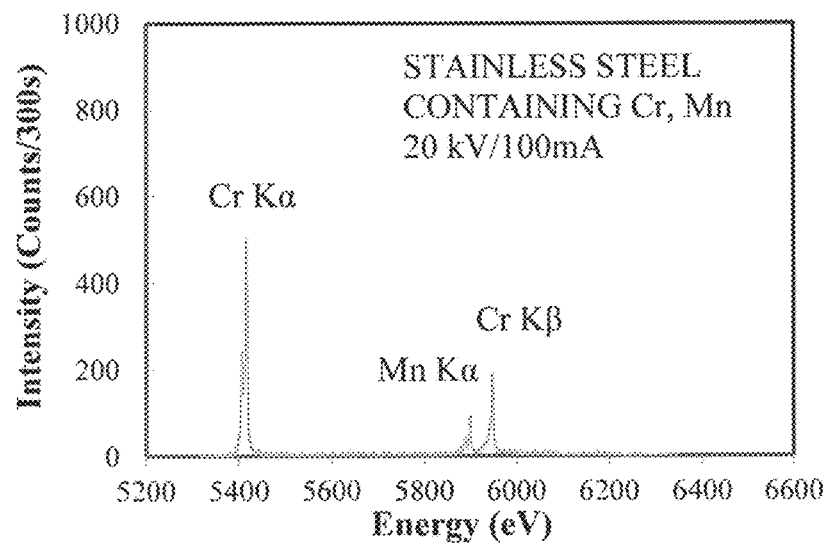
FIG. 11A is a graph illustrating the results of measuring characteristic X-rays obtained from a stainless steel containing Cr and Mn using the X-ray spectroscopic analysis apparatus illustrated in FIG. 9.
Figure 11B:
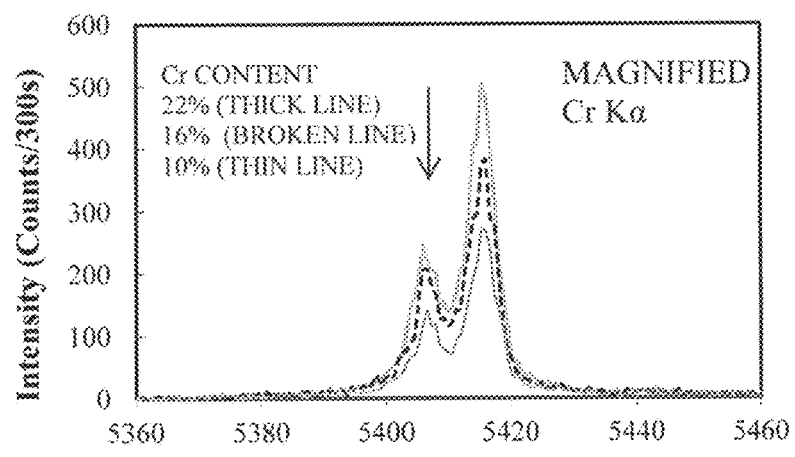
FIG. 11B is a partially enlarged view of graphs of characteristic X-rays obtained from three kinds of samples having different contents of Cr using the X-ray spectroscopic analysis apparatus illustrated in FIG. 9.
Figure 11C:
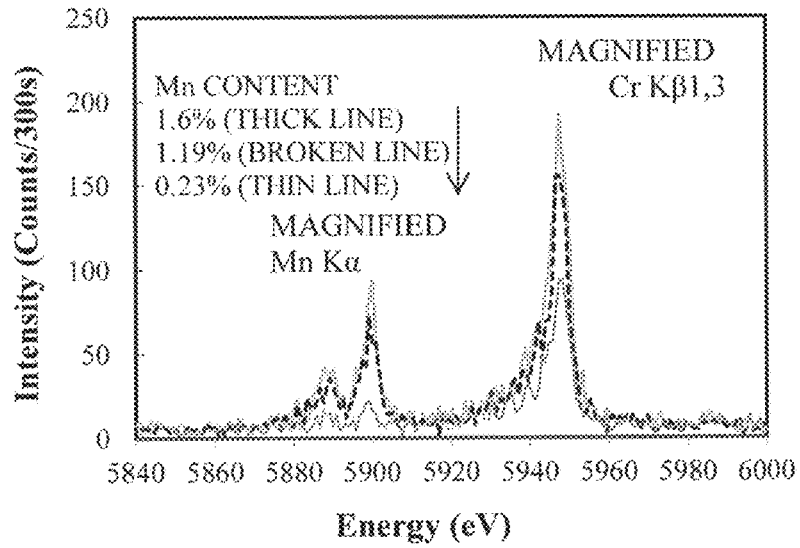
FIG. 11C is a partially enlarged view of graphs of characteristic X-rays obtained from three samples having different contents of Mn using the X-ray spectroscopic analysis apparatus illustrated in FIG. 9.

FIG. 11A, FIG. 11B, and FIG. 11C illustrate the results of measuring a characteristic X-ray on a stainless steel containing Cr and Mn as a sample, using the X-ray spectroscopic analysis apparatus 10 having the analyzing crystal 14 and the X-ray linear sensor 15, each of which has the size and the disposition different from those illustrated in FIG. 9. As illustrated in FIG. 11A, the Kα line and the Kβ line of Cr, as well as the Kα line of Mn are detected. FIG. 11B illustrates the Kα line of Cr under magnification from among characteristic X-rays measured from three kinds of samples having different contents of Cr and Mn (note that FIG. 11B does not illustrate data on Mn). As illustrated in the drawing, obtained data shows the Kα1 line and the Kα2 line of Cr separated. The determination of the contents of Cr from pieces of data obtained for these three kinds of samples shows 22%, 16%, and 10% in a descending order of the intensities of the characteristic X-rays. FIG. 11C illustrates the Kβ line of Cr and the Kα line of Mn on the above three kinds of samples under magnification. The determination of the contents of Mn from pieces of data on the Kα line of Mn shows 1.6%, 1.19%, and 0.23% in a descending order of the intensities of the characteristic X-rays.

Figure 12A:
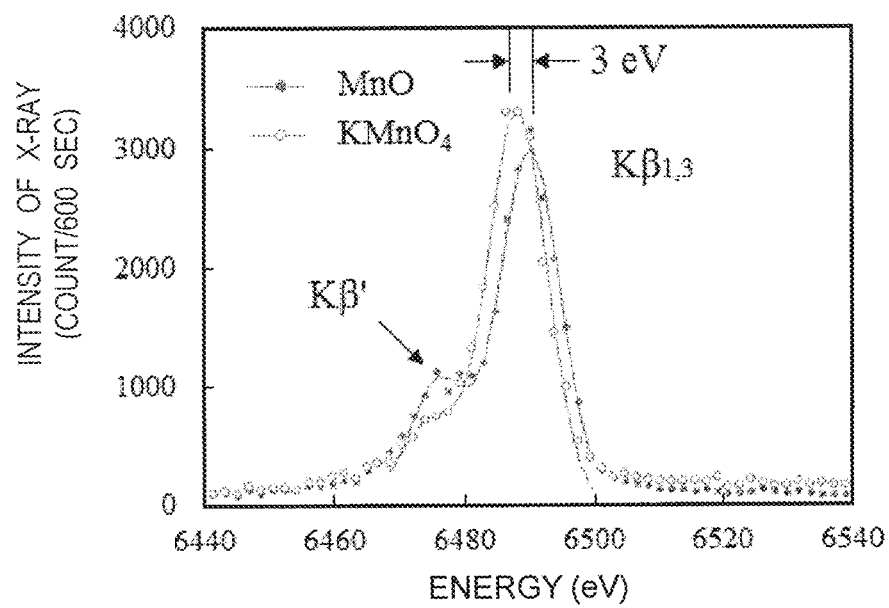
FIG. 12A is a graph illustrating the results of measuring characteristic X-rays obtained from MnO (a divalent Mn) and $KMnO_4$ (a heptavalent Mn) using the X-ray spectroscopic analysis apparatus illustrated in FIG. 9.
Figure 12B:
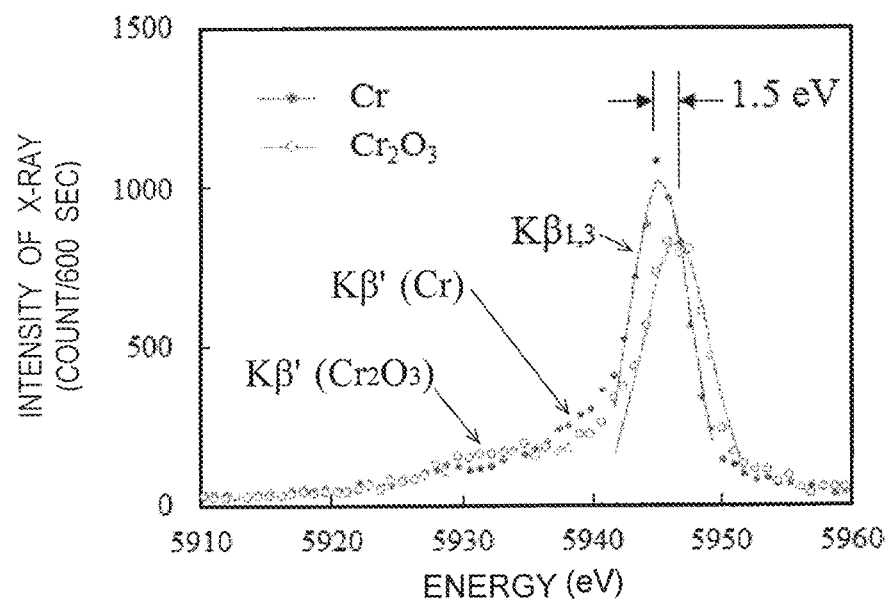
FIG. 12B is a graph illustrating the results of measuring characteristic X-rays obtained from pure chromium (a zero-valent Cr) and $Cr_2O_3$ (a trivalent Cr) using the X-ray spectroscopic analysis apparatus illustrated in FIG. 9.

FIG. 12A and FIG. 12B illustrate the results of measuring characteristic X-rays (Kβ1, 3 lines) obtained from MnO (a divalent Mn) and KMnO$_4$ (a heptavalent Mn) using the X-ray spectroscopic analysis apparatus 10 illustrated in FIG. 9, as well as pure chromium (a zero-valent Cr) and Cr$_2$O$_3$ (a trivalent Cr), using the X-ray spectroscopic analysis apparatus 10 having the analyzing crystal 14 and the X-ray linear sensor 15, each of which has the size and the disposition different from those illustrated in FIG. 9. The energies at peak tops of characteristic X-rays differ by about 3 eV between the divalent Mn and the heptavalent Mn (FIG. 12A) and differ by about 1.5 eV between the zero-valent Cr and the trivalent Cr. By means of this measurement, the valence of an element such as Mn and Cr in a sample can be determined from the results of measuring characteristic X-rays. In addition, FIG. 12A illustrates satellite peaks (marked as Kβ3' in the drawing) appearing on a low-energy side of the peaks of Kβ1, 3 lines of Mn, where the satellite peak of the divalent Mn has an intensity greater than the intensity of the satellite peak of the heptavalent Mn. By means of the intensities of the satellite peaks, the valence of an element such as Mn in a sample can be also determined. Additionally, FIG. 12B illustrates the peak position of Kβ' different between Cr and Cr$_2$O$_3$. This allows, for some substances, the valence of an element to be determined from the peak energy of a satellite peak. Furthermore, by measuring aging on one or more of the energy of the peak top, the intensity of a satellite peak, and the energy of the satellite peak of the characteristic X-ray, it is possible to measure temporal changes in the valence of an element in a sample. From these temporal changes in the valence, it is possible to learn about the temporal course of a reaction of a sample. In addition, the energy of the peak top of characteristic X-ray also differs between a hexavalent Cr (hexavalent chromium), which is widely known for its hazards and on which the measurement is not performed in the present embodiment for reasons of the sample, and Cr of other valences, and thus it is possible to detect the hexavalent chromium using the X-ray spectroscopic analysis apparatus in the present embodiment.

Note that determining the valence of an element based on the difference between energies at the peak tops of characteristic X-rays is attempted with a conventional wavelength-dispersive X-ray spectroscopic analysis apparatus described in Non Patent Literature 1, and with a detector using a synchrotron radiation in Non Patent Literatures 2 and 3. The X-ray spectroscopic analysis apparatus in the present embodiment can perform measurement with an accuracy higher than the accuracy of the apparatus described in Non Patent Literature 1. The apparatuses described in Non Patent Literature 2 and 3 are large-scale and expensive, which makes it virtually impossible for ordinary inspection institutes to possess them, whereas the X-ray spectroscopic analysis apparatus in the present embodiment is small-scale and relatively inexpensive.

Figure 13A:
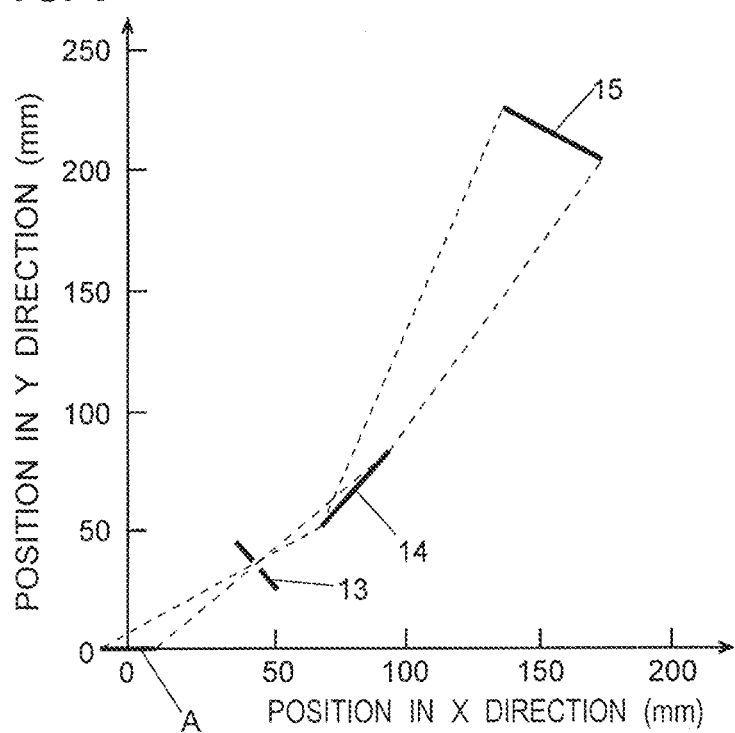
FIG. 13A and FIG. 13B are schematic diagrams illustrating other examples of the size and the disposition of the analyzing crystal, as well as the size and disposition of the X-ray linear sensor, in the X-ray spectroscopic analysis apparatus according to the present invention.

FIG. 13A illustrates another example of the size and the disposition of the analyzing crystal 14, as well as the size and the disposition of the X-ray linear sensor 15, in the X-ray spectroscopic analysis apparatus 10 in the first embodiment. This example is made capable of detecting a wider range of the energies of characteristic X-rays than the range of energies detectable by the example illustrated in FIG. 9, for the purpose of measuring the amounts of a plurality of kinds of hazardous elements contained in produce (in particular, grain) or soil, at the same time. Elements and characteristic X-rays to be measured are the K$\alpha$1 line of arsenic (As) (10544 eV), the L$\alpha$1 line of mercury (Hg) (9989 eV), the L$\alpha$1 line of lead (Pb) (10552 eV), and the K$\alpha$1 line of cadmium (Cd) (23174 eV). To cover these elements, the detectable range of energies of characteristic X-rays is set at EL=9779 eV and EH=26369 eV. The size of the analyzing crystal 14 in a cross section perpendicular to the slit 13 is 45 mm. The size of the X-ray linear sensor 15 in the cross section is 64 mm, which is the same as in the example illustrated in FIG. 9. The X-ray linear sensor 15 includes the detection elements 151, the number of which is 1280 in total, arranged in a line at 50-$\mu$m intervals, which is also the same as in the example illustrated in FIG. 9. The position of the slit 13 is x=43.3, y=36.3, the center position of the analyzing crystal 14 is x=80.0, y=67.1, and the center position of the X-ray linear sensor 15 is x=163.8, y=210.5. The incidence angles of characteristic X-rays on the analyzing crystal 14 are $\theta_1$=18.354° and $\theta_2$=6.706°. With this configuration, the average energy resolution of the X-ray spectroscopic analysis apparatus 10 is (26369−9779)/1280=12.96 eV. Therefore, this example can identify that a sample contains one of As and Pb but cannot distinguish them from each other because the difference in energy between the K$\alpha$1 line of As and the L$\alpha$1 line of Pb is 8 eV, which is lower than the average energy resolution of the X-ray spectroscopic analysis apparatus 10.

Figure 13B:
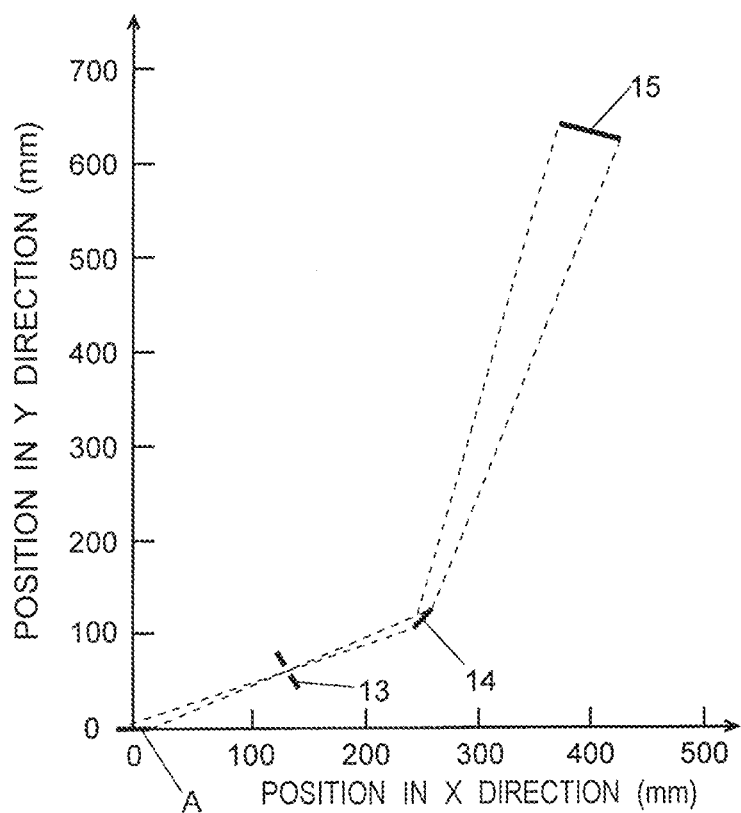

FIG. 13B illustrates still another example of the size and the disposition of the analyzing crystal 14, as well as the size and the disposition of the X-ray linear sensor 15, in the X-ray spectroscopic analysis apparatus 10 in the first embodiment. The objective of this example is to measure the amounts of As, Hg, Pb, and selenium (Se) from among hazardous elements in produce or soil at the same time, as well as to distinguish and detect As and Pb. Characteristic X-rays to be measured are the same as the above for As, Hg, and Pb, and the K$\alpha$1 line of Se (11222 eV). In this example, since the range of the energies of characteristic X-rays to be detected is narrower than the range of the example of FIG. 13A, the range of energies of characteristic X-rays detectable by the X-ray spectroscopic analysis apparatus 10 is made narrower than the detectable range of the example of FIG. 13A. Additionally, to distinguish between the K$\alpha$1 line of As and the L$\alpha$1 line of Pb, the distance between the analyzing crystal 14 and the X-ray linear sensor 15 is widened, whereby the range of the wavelengths of characteristic X-rays entering a detection element 151 is narrowed, so that the average energy resolution of the X-ray spectroscopic analysis apparatus 10 is increased. Specifically, the position of the slit 13 is x=117.8, y=54.9, the center position of the analyzing crystal 14 is x=250.0, y=116.6, the center position of the X-ray linear sensor 15 is x=401.0, y=633.0. The size of the analyzing crystal 14 in a cross section perpendicular to the slit 13 is 30 mm. The size of the X-ray linear sensor 15, and the intervals and the number of the detection elements 151 are the same as those of the example of FIG. 13A. The incidence angles of characteristic X-rays on the analyzing crystal 14 are $\theta_1$=27.029° and $\theta_2$=22.129°. With this configuration, the maximum value EH of detectable energies of characteristic X-rays is 11558 eV, the minimum value EL of detectable energies of characteristic X-rays is 9581 eV, and the average energy resolution of the X-ray spectroscopic analysis apparatus 10 is (11558−9581)/1280=1.54 eV.

REFERENCE SIGNS LIST 10, 20 . . . X-ray spectroscopic analysis apparatus
11, 11A, 11B . . . sample holder
111A . . . movement mechanism
111B . . . agitator
12 . . . radiation source
13 . . . slit
131 . . . surface on irradiation area side of slit
132 . . . surface on analyzing crystal side of slit
133 . . . midpoint between surface on irradiation area side and surface on analyzing crystal side of slit
14 . . . analyzing crystal
15 . . . X-ray linear sensor
151, 1511, 1512, 151C, 151S . . . detection element
16 . . . X-ray shield
161 . . . window of X-ray shield
23 . . . second slit
25 . . . energy-detecting X-ray linear sensor
251 . . . energy detection element

The invention claimed is:

1. An elemental analysis method, comprising:
irradiating a predetermined irradiation area in a surface of a sample with an excitation beam, thereby generating characteristic X-rays from emission regions in the irradiation area, X-rays from each of emission regions having a range of wavelengths;
making the characteristic X-rays generated at the predetermined irradiation area partly pass through a slit such that X-rays through the slit originate from the emission regions and have the range of wavelengths;
making the X-rays through the slit enter into a planar analyzing crystal such that X-rays are selectively reflected on the analyzing crystal based on Bragg reflection law, the slit being provided between the irradiation area and the planar analyzing crystal and extending in a direction parallel to the irradiation area and a predetermined crystal plane of the planar analyzing crystal;
obtaining a wavelength spectrum of the reflected X-rays by simultaneously detecting intensities of X-rays from the analyzing crystal by one of linear detection elements, the detection elements collectively forming an X-ray linear sensor, respectively, the X-ray linear sensor being provided so that an average energy resolution becomes 2 eV or less by arranging the linear detection elements, each having a length in a direction parallel to the slit, in a direction perpendicular to the slit; and
one or both of identifying an element in the sample based on an energy of a peak of at least one of a K$\alpha$ line, a K$\beta$ line, an L$\alpha$ line, and an L$\beta$ line included in the wavelength spectrum, and determining an amount of the element based on an intensity of the peak, wherein
each wavelength of the reflected X-rays is detected by corresponding one of the linear detection elements of the X-ray linear sensor, the detected wavelengths each corresponding to different linear portions defined on the emission regions in the irradiation area.

2. The elemental analysis method according to claim 1, wherein:
the peak is at least one of a K$\alpha$1 line, a K$\alpha$2 line, a K$\beta$1 line, a K$\beta$3 line, an L$\alpha$1 line, an L$\alpha$2 line, an L$\beta$1 line, and an L$\beta$2 line detected by the X-ray linear sensor.

3. The elemental analysis method according to claim 1, further comprising
    determining a valence of an element in the sample based on one or more of an energy of a peak included in the wavelength spectrum, an intensity of a satellite peak on a low-energy side of the peak, and an energy of the satellite peak.

4. The elemental analysis method according to claim 3, further comprising measuring temporal changes in one or more of the energy of the peak, the intensity of the satellite peak, and the energy of the satellite peak, and determining temporal changes in a valence of the element in the sample based on the temporal changes.

* * * * *